United States Patent [19]
Drake et al.

[11] Patent Number: 6,098,160
[45] Date of Patent: *Aug. 1, 2000

[54] DATA POINTER FOR OUTPUTTING INDIRECT ADDRESSING MODE ADDRESSES WITHIN A SINGLE CYCLE AND METHOD THEREFOR

[75] Inventors: Rodney J. Drake; Randy L. Yach; Igor Wojewoda; Joseph W. Triece, all of Phoenix; Brian Boles, Mesa; Darrel Johansen, Tempe, all of Ariz.

[73] Assignee: Microchip Technology Incorporated, Chandler, Ariz.

[ * ] Notice: This patent is subject to a terminal disclaimer.

[21] Appl. No.: 08/959,559

[22] Filed: Oct. 28, 1997

[51] Int. Cl.$^7$ ...................................................... G06F 12/00
[52] U.S. Cl. ............................ 711/200; 712/43; 711/219; 711/220
[58] Field of Search ..................................... 711/211, 214, 711/219, 220, 200, 212; 712/220, 43

[56] References Cited

U.S. PATENT DOCUMENTS

| | | | |
|---|---|---|---|
| 5,142,633 | 8/1992 | Murray et al. ........................ | 64/231.8 |
| 5,450,553 | 9/1995 | Kitagaki et al. ...................... | 711/214 |
| 5,488,730 | 1/1996 | Brown, III et al. ................... | 712/41 |
| 5,715,418 | 2/1998 | Atsatt et al. .......................... | 711/202 |
| 5,717,946 | 2/1998 | Satou et al. ........................... | 712/225 |
| 5,835,973 | 11/1998 | Kyuma et al. ......................... | 711/220 |
| 5,905,881 | 5/1999 | Tran et al. ............................ | 712/219 |
| 5,907,864 | 5/1999 | Potts et al. ............................ | 711/169 |
| 5,987,583 | 11/1999 | Triece et al. .......................... | 711/214 |

*Primary Examiner*—John W. Cabeca
*Assistant Examiner*—Pierre-Michel Bataille
*Attorney, Agent, or Firm*—Ronald L. Chichester; Paul N. Katz; Frohwitter

[57] ABSTRACT

A data pointer for generating an indirect addressing mode address within a single cycle for a selected one of a plurality of multiple indirect addressing modes. The data pointer is used with a processor architecture scheme which allows for encoding of multiple addressing modes. A data pointer register is coupled to the processor architecture scheme for storing a current address of an operand to be used in a simple indirect addressing mode. An incrementer is coupled to the data pointer register for incrementing the current address of an operand to be used in a simple indirect data addressing mode by a set number thereby generating an address of an operand to be used in an indirect addressing mode with auto preincrement. An adder is coupled to the data pointer register for combining the current address of an operand to be used in a simple indirect data addressing mode with an offset number thereby generating an address of an operand to be used in an indirect addressing mode with offset. A multiplexer circuit is coupled to an output of the data pointer register, to an output of the incrementer, and to an output of the adder for selecting a desired indirect addressing mode address.

12 Claims, 2 Drawing Sheets

DATA POINTER FOR OUTPUTTING INDIRECT ADDRESSING MODE ADDRESSES WITHIN A SINGLE CYCLE AND METHOD THEREFOR

RELATED APPLICATIONS

This application is related to the application entitled "PROCESSOR ARCHITECTURE SCHEME FOR IMPLEMENTING VARIOUS ADDRESSING MODES AND METHOD THEREFOR" Ser. No. 08/946,486 filed on Oct. 7, 1997, in the name of Mitra et al., and assigned to the same assignee as this Application. The disclosure of the above referenced application is hereby incorporated by reference into this application.

BACKGROUND OF THE INVENTION

1. Field of the Invention

This invention relates generally to pointers and, more specifically, to a data pointer for generating an indirect addressing mode address within a single cycle for a selected one of a plurality of multiple indirect addressing modes.

2. Description of the Prior Art

Generally speaking, a processor is an entity where a central processing unit (CPU) is present and is used to fetch and execute stored instructions or microcode. Some examples of processors are microcontrollers, microprocessors, and digital signal processors. Each type of processor operates on data which is commonly referred to as operands. This data is generally stored in registers or memory space.

An instruction directs the CPU of a processor to execute a certain operation as well as to identify one or more operand(s) for the operation. Processors offer various means for addressing the data for an operation. These means are commonly referred to as addressing modes. The addressing modes are typically used for arithmetic and logical operations and data move operations and may apply to a source operand, a destination operand, or both.

When implementing certain indirect addressing modes, there are certain speed critical issues which must be addressed. In order to obtain the proper address for certain indirect addressing modes, two or more cycles are required to properly load the correct address. These delays may cause timing problems. For example, if an instruction requires an indirect addressing mode with offset, the value needs to be available immediately. If one tries to perform the offset function after the request, it could not be done with a simple serial adder. A look ahead adder may be able to provide the proper address, but implementing this type of adder would require large amounts of valuable silicon real estate thereby increasing the cost. Therefore, there must either be a tradeoff between silicon real estate or timing in the prior art.

Therefore, a need existed to provide a data pointer for generating indirect addressing mode addresses. The data pointer must be able to generate the indirect addressing mode address within a single cycle for the selected indirect addressing mode. The data pointer must be able to generate the indirect addressing mode address within a single cycle for the selected indirect addressing mode without significantly increasing the amount of silicon real estate in the processor architecture.

SUMMARY OF THE INVENTION

In accordance with one embodiment of the present invention, it is an object of the present invention to provide a data pointer for generating indirect addressing mode addresses.

It is another object of the present invention to provide a data pointer that is able to generate an indirect addressing mode address within a single cycle for the selected indirect addressing mode.

It is yet another object of the present invention to provide a data pointer that is able to generate an indirect addressing mode address within a single cycle for the selected indirect addressing mode without significantly increasing the amount of silicon real estate in the processor architecture.

BRIEF DESCRIPTION OF THE PREFERRED EMBODIMENTS

In accordance with one embodiment of the present invention, a data pointer for generating an indirect addressing mode address within a single cycle for a selected one of a plurality of multiple indirect addressing modes is disclosed. The data pointer is to be used with a processor architecture scheme which allows for encoding of multiple addressing modes. A data pointer register is coupled to the processor architecture scheme and is used for storing a current address of an operand to be used in a simple indirect addressing mode. An incrementer is coupled to the data pointer register for incrementing the current address of the operand to be used in a simple indirect data addressing mode by a set number for generating an address of an operand to be used in an indirect addressing mode with auto preincrement. An adder is coupled to the data pointer register for combining the current address of an operand to be used in a simple indirect data addressing mode with an offset number for generating an address of an operand to be used in an indirect addressing mode with offset. A multiplexer circuit is coupled to an output of the data pointer register, to an output of the incrementer, and to an output of the adder. The multiplexer is used for selecting a desired indirect addressing mode address.

In accordance with another embodiment of the present invention, a method for providing a data pointer for generating an indirect addressing mode address within a single cycle for a selected one of a plurality of multiple indirect addressing modes comprising the steps of: providing a processor architecture scheme which allows for encoding of multiple addressing modes; providing a data pointer register coupled to the processor architecture scheme for storing a current address of an operand to be used in a simple indirect addressing mode; providing an incrementer coupled to the data pointer register for incrementing the current address of an operand to be used in a simple indirect data addressing mode by a set number for generating an address of an operand to be used in an indirect addressing mode with auto preincrement; providing an adder coupled to the data pointer register for combining the current address of an operand to be used in a simple indirect data addressing mode with an offset number for generating an address of an operand to be used in an indirect addressing mode with offset; and providing a multiplexer circuit coupled to an output of the data pointer register, to an output of the incrementer, and to an output of the adder for selecting a desired indirect addressing mode address.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
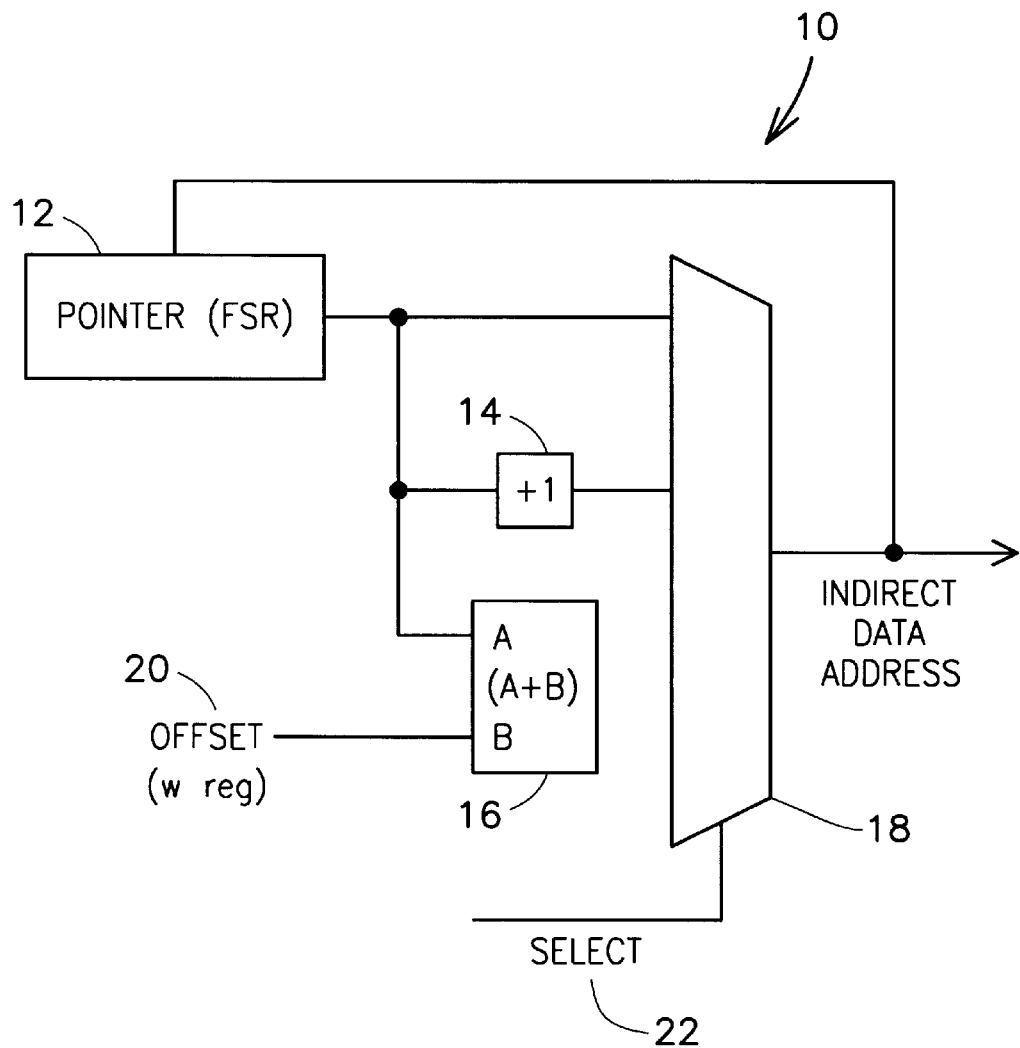
FIG. 1 is a simple block diagram of a data pointer for generating an indirect addressing mode address within a single cycle for a selected one of a plurality of multiple indirect addressing modes.

Referring to FIG. 1, a data pointer 10 for generating an indirect addressing mode address within a single cycle for a selected one of a plurality of multiple indirect addressing modes is shown. The data pointer 10 is to be implemented in a processor architecture scheme 30 (FIG. 2) which allows for the encoding of multiple indirect addressing modes. The data pointer 10 has a data pointer register 12 which is coupled to the processor architecture scheme 30. The data pointer register 12 is used for storing a current address of an operand to be used in a simple indirect addressing mode.

The data pointer 10 has an incrementer 14 which has an input coupled to an output of the data pointer register 12. The incrementer 14 is used for incrementing the current address of the operand stored in the data pointer register 12 (i.e., current address of the operand to be used in a simple indirect addressing mode). The incrementer 14 increases this address by a set number. In the preferred embodiment of the present invention the incrementer 14 increments the current address stored in the data pointer register 12 by one address location. By incrementing the current address of the operand to be used in a simple indirect addressing mode prior to data access, the incrementer 14 is able to generate an address of an operand to be used in an indirect addressing mode with auto preincrement.

Figure 2:
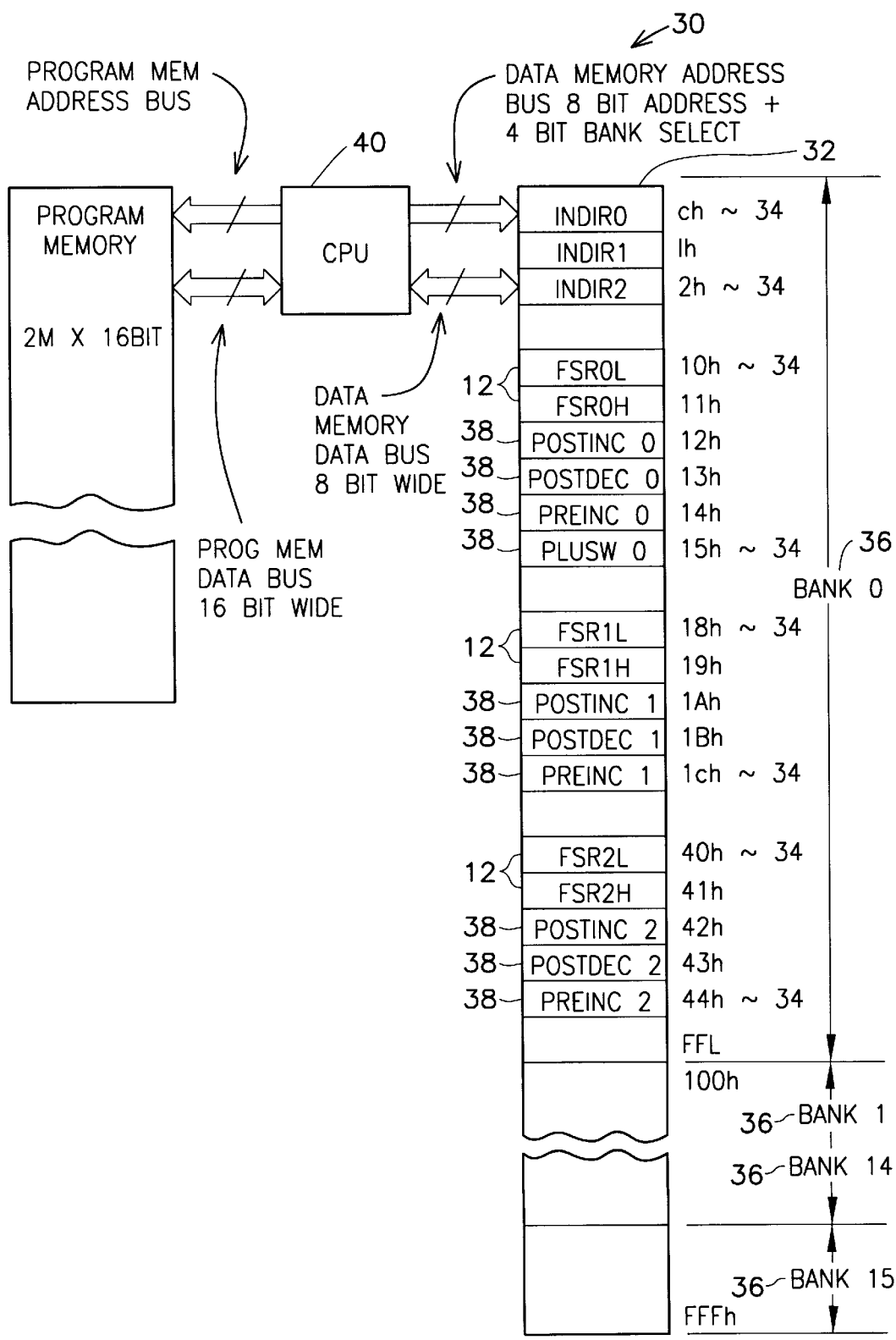
FIG. 2 is a processor architecture scheme used with the data pointer depicted in FIG. 1.

The data pointer 10 further has an adder 16 which has an input coupled to an output of the data pointer register 12. The adder 16 is used for combining the current address stored in the data pointer register 12 with an offset value. By combining the current address in the data pointer register 12 with an offset value, the adder 16 is able to generate the address of an operand to be used in an indirect addressing mode with offset. The offset value may be loaded from any memory device in the system. In the preferred embodiment of the present invention the offset value is stored in an offset register 20 which is stored in the data memory 32 (FIG. 2) of the processor architecture 30 (FIG. 2). The adder 16 may be any type of adder. The adder 14 may be a look ahead adder but this will require the use of additional silicon real estate which is not desired. Preferably, a simple serial adder with a serial carry is used.

A multiplexer circuit 18 has a first input coupled to an output of the data pointer register 12, a second input coupled to an output of the incrementer 14, and a third input coupled to an output of the adder 16. The multiplexer circuit 18 is used for selecting a desired indirect addressing mode address generated by the aforementioned elements and outputting the selected address to an instruction register. A selection line 22 is coupled to the multiplexer circuit 18. The selection line 22 is further coupled to the processor architecture scheme 30. When a desired indirect addressing mode is selected in the processor architecture scheme 30, the selection line 22 will signal the multiplexer circuit 18 which address to output to the instruction register.

Referring now to FIG. 2, the processor architecture scheme 30 is shown. The processor architecture scheme 30 must allow for the encoding of multiple addressing modes. Preferably, the processor architecture scheme 30 will allow for the encoding of multiple indirect addressing modes through the use of virtual register addresses. This allows the processor architecture scheme 30 to maximize the number of directly addressable registers.

The data pointer register 12 is implemented in data memory 32. The data memory 32 is comprised of a plurality of address locations 34. In the embodiment shown in FIG. 2, the data memory 32 is a linearized 4K memory which is divided into a plurality of banks 36 wherein each bank 36 has 256 address locations 34. The data pointer register 12 has one or more virtual register address locations 38 reserved in the register address map. Each reserved virtual register address location 38 will initiate an indirect addressing mode when accessed.

Presently, there are five main types of addressing modes: simple indirect addressing, indirect addressing with auto post increment, indirect addressing with auto post decrement, indirect addressing with auto pre increment, and indirect addressing with offset. In a simple indirect addressing mode, the address of the operand is held in the data pointer register 12. The CPU 40 will first access the data pointer register 12 to get the address and using this address will access the operand. Indirect addressing with auto increment or auto decrement are forms of indirect addressing where the data pointer register 12 is incremented or decremented either before the data access (i.e., pre-increment or pre-decrement) or after the data access (i.e., post-increment or post-decrement). In an indirect addressing mode with offset, the address of the operand is calculated by adding an offset value to the contents of the data pointer register 12. The offset value may be embedded in the instruction or may come from yet another register. In the present embodiment, the offset value comes from the "w" register 20 (FIG. 1), which is the accumulator or "working" register. As before, the data pointer register 12 may be incremented or decremented before or after the operand access.

The data pointer register 12 will require a separate virtual register address location 38 in data memory 32 for each indirect addressing mode to be implemented. In the preferred embodiment of the present invention, five virtual register address locations 38 are required to implement the five indirect addressing modes discussed above. However, additional or fewer indirect addressing modes may be implemented depending on the use of the data pointer register 12. Furthermore, additional data pointer registers 12 may be implemented in data memory 32. Each data pointer register 12 will have one or more virtual register address locations 38 reserved in the register address map. Each reserved virtual register address location 38 will initiate an indirect addressing mode for the associated data pointer register 12 when accessed. Each data pointer register 12 is a readable and writable address location. In the preferred embodiment of the present invention, each data pointer register 12 is a 12 bit wide pointer capable of accessing a 4K byte long memory area. Therefore, each data pointer register 12 is organized as two 8 bit wide registers (high byte and low byte) which are accessible as readable and writable registers. Thus, in the preferred embodiment of the present invention, 7 address locations are used to implement a 12 bit wide data pointer with five indirect addressing modes.

OPERATION

Referring now to FIG. 2, the operation of the present invention will be discussed. Within the first bank (i.e., Bank 0), the first 128 locations are reserved for special function registers. These locations are also where the special indirect addresses are located. One or more data pointer registers 12 will also be located in this area. Each data pointer register 12 will have one or more virtual register address locations 38 reserved in the register address map to initiate indirect addressing. If none of the indirect addressing locations are accessed, direct addressing will occur. If an instruction accesses one of the reserved address locations 38, an indirect addressing mode is to be used with the associated data pointer register 12. For example, if the instruction is "ADD w, 12h", the instruction will normally add the contents of "w" with the contents in address 12h and place the answer in "w". However, since the address 12h is a reserved address location for the data pointer register 12 at addresses 10h, 11h, "w" will be added to the contents of the real location pointed to by the data pointer register 36 at addresses 10h, 11h. The total will then be stored in "w". Address 12h also states that a post increment is involved. Thus, the data pointer register 36 at addresses 10h, 11h will then be automatically incremented by a set value, normally one address location.

The data pointer 10 has all indirect addressing mode addresses preloaded (i.e., simple indirect addressing mode address in data pointer register; indirect addressing mode with auto preincrement in the incrementer 14, and indirect addressing mode with offset address in the adder 16). When one of the reserved virtual register address location 38 is accessed, it will send a signal to the multiplexer circuit 18 to output the desired indirect addressing mode address to the instruction register. It should be noted that the data pointer 10 will output the address stored in the data pointer register 12 when the addresses for indirect addressing mode with auto post increment and indirect addressing with auto post decrement are accessed. This address will then be incremented or decremented after execution of the instruction. When the data in the data pointer register 12 or the offset register 20 is changed, the data pointer 10 will update and generate new addresses. Thus, the pointer is always able to output the desired indirect addressing mode address within a single cycle without requiring additional silicon real estate to be used for look ahead adders and the like.

While the invention has been particularly shown and described with reference to preferred embodiments thereof, it will be understood by those skilled in the art that the foregoing and other changes in form, and details may be made therein without departing from the spirit and scope of the invention.

What is claimed is:

1. A data pointer for generating an indirect addressing mode address within a single cycle for a selected one of a plurality of multiple indirect addressing modes comprising, in combination:

a data pointer register for storing a current address of an operand to be used in a simple indirect addressing mode;

a processor architecture scheme which allows for encoding of multiple addressing modes, said processor architecture scheme comprising:
 a central processing unit (CPU);
 a memory coupled to said CPU for storing data; and
 dedicated virtual register address locations in said memory associated with said data pointer register wherein each of said dedicated virtual register address locations dictates and establishes a separate and different indirect addressing mode to be used with said data pointer register when accessed;

an incrementer coupled to said data pointer register for incrementing said current address of an operand to be used in a simple indirect data addressing mode by a set number for generating an address of an operand to be used in an indirect addressing mode with auto preincrement;

an adder coupled to said data pointer register for combining said current address of an operand to be used in a simple indirect data addressing mode with an offset number for generating an address of an operand to be used in an indirect addressing mode with offset, said adder being a simple serial adder with serial carry;

an offset register coupled to said adder for storing and sending said offset number to said adder when signaled; and a multiplexer circuit coupled to an output of said data pointer register, to an output of said incrementer, and to an output of said adder for selecting a desired indirect addressing mode address.

2. A data pointer for generating an indirect addressing mode address within a single cycle in accordance with claim 1 wherein said multiplexer has a select input coupled to said dedicated virtual register address locations for selecting said desired indirect addressing mode address.

3. A data pointer for generating an indirect addressing mode address within a single cycle in accordance with claim 1 wherein said dedicated virtual register address locations in said memory has one dedicated virtual register address location for simple indirect addressing, one dedicated virtual register address location for indirect addressing with auto pre increment, and one dedicated virtual register address location for indirect addressing with offset.

4. A data pointer for generating an indirect addressing mode address within a single cycle for a selected one of a plurality of multiple indirect addressing modes comprising, in combination:

a processor architecture scheme which allows for encoding of multiple addressing modes;

a data pointer register coupled to said processor architecture scheme for storing a current address of an operand to be used in a simple indirect addressing mode;

an incrementer coupled to said data pointer register for incrementing said current address of an operand to be used in a simple indirect data addressing mode by a set number for generating an address of an operand to be used in an indirect addressing mode with auto preincrement;

an adder coupled to said data pointer register for combining said current address of an operand to be used in a simple indirect data addressing mode with an offset number for generating an address of an operand to be used in an indirect addressing mode with offset, said adder being a simple serial adder with serial carry;

a multiplexer circuit coupled to an output of said data pointer register, to an output of said incrementer, and to an output of said adder for selecting a desired indirect addressing mode address; and an offset register coupled to said adder for storing and sending said offset number to said adder.

5. A data pointer for generating an indirect addressing mode address within a single cycle in accordance with claim 4 wherein said processor architecture scheme comprises:

a central processing unit (CPU);

a memory coupled to said CPU for storing data; and dedicated virtual register address locations in said memory associated with said data pointer register wherein each of said dedicated virtual register address locations dictates and establishes a separate and different indirect addressing mode to be used with said data pointer register when accessed.

6. A data pointer for generating an indirect addressing mode address within a single cycle in accordance with claim 5 wherein said multiplexer has a select input coupled to said dedicated virtual register address locations for selecting said desired indirect addressing mode address.

7. A data pointer for generating an indirect addressing mode address within a single cycle in accordance with claim 5 wherein said dedicated virtual register address locations in said memory has one dedicated virtual register address location for simple indirect addressing, one dedicated virtual register address location for indirect addressing with auto pre increment, and one dedicated virtual register address location for indirect addressing with offset.

8. A method for providing a data pointer for generating an indirect addressing mode address within a single cycle for a selected one of a plurality of multiple indirect addressing modes comprising the steps of:

providing a processor architecture scheme which allows for encoding of multiple addressing modes;

providing a data pointer register coupled to said processor architecture scheme for storing a current address of an operand to be used in a simple indirect addressing mode;

providing an incrementer coupled to said data pointer register for incrementing said current address of an operand to be used in a simple indirect data addressing mode by a set number for generating an address of an operand to be used in an indirect addressing mode with auto preincrement;

providing an adder coupled to said data pointer register for combining said current address of an operand to be used in a simple indirect data addressing mode with an offset number for generating an address of an operand to be used in an indirect addressing mode with offset, said adder being a simple serial adder with serial carry; and providing a multiplexer circuit coupled to an output of said data pointer register, to an output of said incrementer, and to an output of said adder for selecting a desired indirect addressing mode address.

9. The method of claim 8 further comprising the step of providing an offset register coupled to said adder for storing and sending said offset number to said adder.

10. The method of claim 8 wherein said step of providing a processor architecture scheme further comprises the steps of:

providing a central processing unit (CPU);

providing a memory coupled to said CPU for storing data; and dedicating virtual register address locations in said memory associated with said data pointer register wherein each of said dedicated virtual register address locations dictates and establishes a separate and different indirect addressing mode to be used with said data pointer register when accessed.

11. The method of claim 10 further comprising the step of coupling a select input of said multiplexer to said dedicated virtual register address locations for selecting said desired indirect addressing mode address.

12. The method of claim 10 wherein said dedicated virtual register address locations in said memory has one dedicated virtual register address location for simple indirect addressing, one dedicated virtual register address location for indirect addressing with auto pre increment, and one dedicated virtual register address location for indirect addressing with offset.

* * * * *